UNITED STATES PATENT OFFICE.

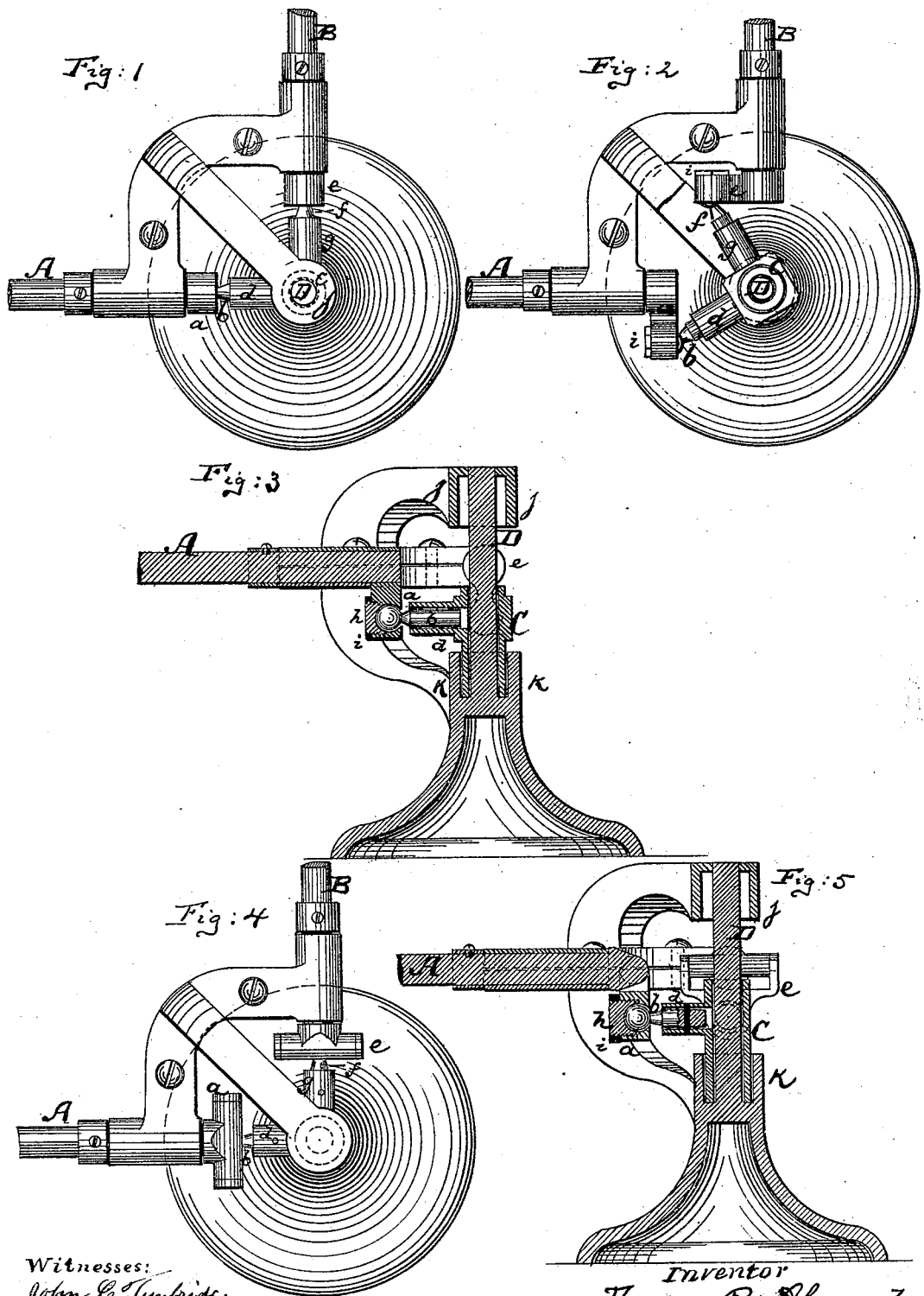

THOMAS R. ALMOND, OF NEW YORK, N. Y.

COUPLING FOR SHAFTING.

SPECIFICATION forming part of Letters Patent No. 236,474, dated January 11, 1881.

Application filed November 11, 1880. (No model.)

*To all whom it may concern:*

Be it known that I, THOMAS R. ALMOND, of New York, in the county and State of New York, have invented a new and Improved Coupling for Shafting, of which the following is a specification.

Figures 1 and 2 are top views of my improved coupling for shafting. Fig. 3 is a vertical section thereof. Fig. 4 is a top view, and Fig. 5 a vertical section of a modification thereof.

This invention relates to a new mechanism for connecting shafts that are placed at an angle to one another, so that the rotating movement of one will be imparted to the other. My improved coupling is applicable to shafts that are in the same plane or in different planes. It is also applicable for converting the rotary motion of a shaft into combined reciprocating and oscillating motion of a slide, or vice versa.

The invention consists, principally, in connecting a crank on each of the two shafts, by a flexible joint, with a slide, so that the rotary motion of the driving-shaft will first be converted into combined oscillating and reciprocating motion of said slide and the reciprocating and oscillating motion of the slide into rotary motion of the driven shaft.

The invention also consists of other details of improvement, which are hereinafter more fully specified.

In the accompanying drawings, the letter A represents one shaft, and B the other shaft. These shafts, of which either one may be the driving-shaft, are hung in suitable supports and at any suitable angle to each other. The drawings represent them as placed at a right angle; but this is not at all essential, nor need the shafts be in the same plane, nor placed in parallel planes, for the purposes of this invention.

The shaft A has a crank, *a*, and in this crank is fitted, by a ball-joint, a swivel-pin, *b*, which enters a tubular socket, *d*, projecting from a sliding tube or rod, C, as shown in Fig. 3. The shaft B has a similar crank, *e*, and in this crank is fitted, by a ball-joint, a swivel-pin, *f*, which enters a tubular socket, *g*, that projects from the tube or rod C. The angle of the sockets *d* and *g* is the same as that of the shafts A and B. Their planes are also relatively the same as those of said shafts.

Instead of swiveling the pins *b* and *f* in the respective cranks, they, or either of them, may be swiveled in the sliding tube or rod C, and in that case the sockets *d* and *g* are formed as projections on the respective cranks.

As the driving-shaft (say the shaft A) is revolved, and with it its crank, the swivel-pin connection causes the slide C to be moved up and down, and at the same time oscillated around its axis. This combined oscillating and reciprocating movement of said slide C is transmitted to the shaft B and converted by its connection *g f e* into rotary motion of said shaft B. By this means undue friction is avoided and strain equalized—that is to say, the strain is not noticeably greater at any one point than at any other, provided the parts are properly made.

As to the ball-connection of the pins *b* and *f*, I prefer to construct the same as shown in Fig. 3—that is to say, form a cup-shaped cavity in each crank, into which the ball can be seated, and then close said cavity behind the ball by a concave-ended screw, *h*, which is screwed into the crank A. For the sake of greater security, a nut, *i*, may be placed upon the outer projecting end of each screw *h*.

As to the oscillating slide C, I prefer to make it tubular and to fit it around a stationary post, D, which has an overhanging hollow cap, *j*, at or near the top and a similar inverted cap, *k*, at the lower part. These hollow caps furnish air-cushions for the ends of the slide C. The air-cushions absorb and neutralize the terminations of the vertical strokes of the slide and prevent the same from becoming violent jars, serving also to assist in starting the return movements of said slide.

Fig. 1 shows the positions of the parts when both cranks *a* and *e* project downward. Fig. 2 shows both cranks after they have made one-quarter of one revolution, showing also how far the slide C has been turned. Fig. 3 shows the same position of parts as Fig. 1. The slide is in the lower position. When the cranks are turned upward it is in the uppermost position.

Instead of causing the swivel-pins to slide in the sockets above described, they may be rigidly united to said sockets, as indicated in Figs. 4 and 5; but in this case the cranks *a* and $e$ are pivoted to their respective shafts, to allow the pins to change their angles during the rotations of the shafts and oscillations of the slide, and at the same time maintain their connections with the cranks and with the slide. Such jointed cranks are shown in Figs. 4 and 5.

It is evident that wherever I have mentioned pins $b\,f$ and sockets $d\,g$ the pins may terminate in sockets, in which case the parts marked $d$ and $g$ will be solid.

I claim—

1. The crank-shafts A B, placed at an angle to one another, and combined with the swivel-pins $b$ and $f$, and with the oscillating and reciprocating slide C, with which said pins are connected, substantially as herein shown and described.

2. The combination of the carrying-crank $a$, having cup-shaped cavity, with the swivel-pin $b$, having ball end, and with the cup-shaped screw $h$, substantially as herein shown and described.

3. The slide C, combined with sockets $d$ and $g$, swivel-pins $b$ and $f$, cranks $a$ and $e$, and shafts A and B, substantially as herein shown and described.

4. In combination with crank-shafts A and B and swivel-pins $b$ and $f$, the oscillating and reciprocating slide C and cushioning-caps $j$ and $k$, substantially as herein shown and described.

5. The crank-shaft A, combined with the swivel-pin $b$, and with the reciprocating and oscillating slide C, substantially as herein shown and described.

THOMAS R. ALMOND.

Witnesses:
   WILLY G. E. SCHULTZ,
   WILLIAM H. C. SMITH.